Figure 1:
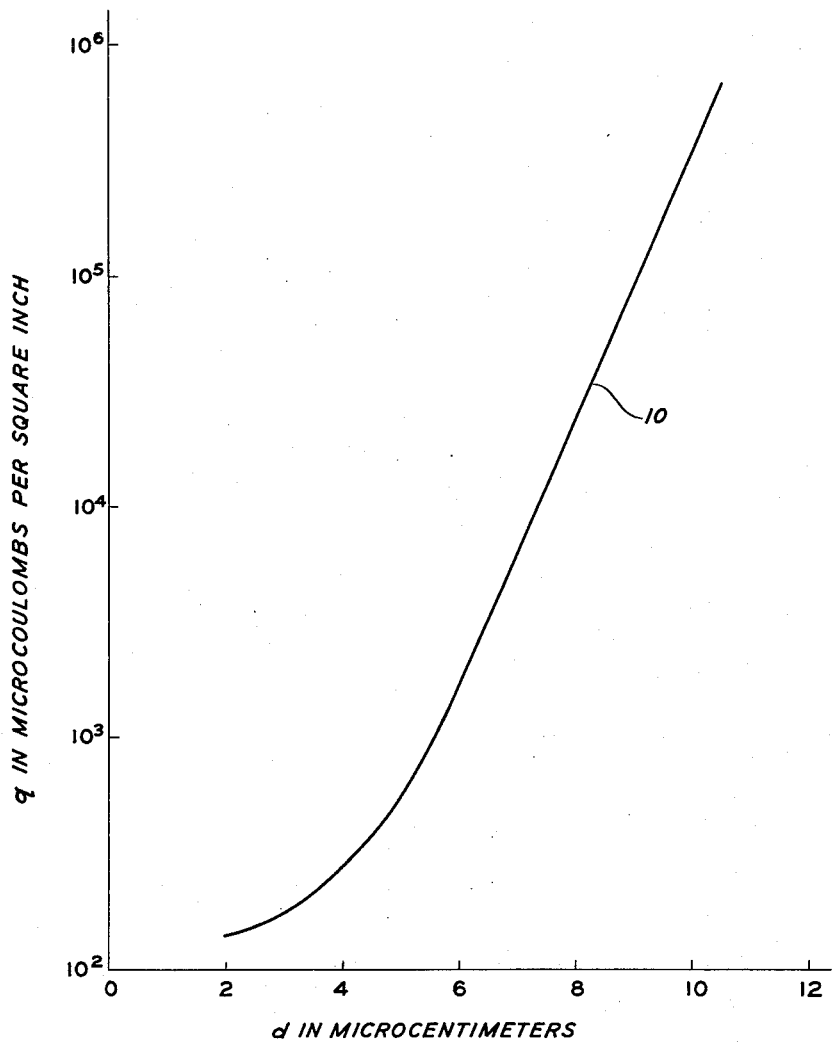

INVENTORS U. F. GIANOLA
L. VAIL SHARP
BY
H. O. Wright
ATTORNEY

United States Patent Office 2,989,385
Patented June 20, 1961

2,989,385
PROCESS FOR ION BOMBARDING AND ETCHING METAL
Umberto F. Gianola, Florham Park, and Leila V. Sharp, Murray Hill, N.J., assignors to Bell Telephone Laboratories, Incorporated, New York, N.Y., a corporation of New York
Filed May 14, 1957, Ser. No. 659,048
1 Claim. (Cl. 41—42)

This invention relates to a new process for treating crystalline materials. More particularly, it relates to a new process for shaping and conditioning semiconductive and other crystalline elements.

Applicants' invention is based upon the broad concept that crystalline materials, in general, have finite solubilities in substantially all solvents. For many solvents, however, particular crystalline materials are of such limited solubility as to be for all practical purposes, insoluble. Furthermore, all crystalline materials when bombarded by ions tend to develop very thin surface layers in which the atomic structure is broken up to such an extent that the layer may have characteristics approaching those of an amorphous material. The quasi-amorphous character of this layer does not coincide completely with a true amorphous state of the material in that annealing of the quasi-amorphous material will usually reconvert it to the initial crystalline state, whereas true amorphous material ordinarily cannot be converted to the crystalline state simply by annealing.

One or more other underlying thin strata may also result in which the atomic structure has been modified as, for example, by the injection of additional atoms in the normal atomic structure of the material, but the modifications are insufficient to affect the essentially crystalline nature of the material.

Applicants have found, however, that the solubility of the very thin quasi-amorphous surface layer is usually significantly different from that of the original crystalline material in that this layer only can be readily dissolved by a solvent in which the remainder of the crystalline material is still virtually insoluble.

Viewed broadly, the general situation may be considered as arising from the fact that the crystalline state is the state of lowest potential energy toward which all substances tend to progress. In the crystalline state therefore the least degree of chemical activity for a particular substance will be observed. The quasi-amorphous state created on the surface of the crystal or crystalline material by bombardment is chemically more active and therefore will normally be soluble in a solvent which will not dissolve the same material in its crystalline form.

Prior activities in the ionic bombardment of crystalline materials are, for example, described in Patent 2,750,541, granted June 12, 1956, to R. S. Ohl, and Patent 2,787,564, granted April 2, 1957, to W. Shockley, both of which patents are assigned to applicants' assignee. The methods of bombardment disclosed in these patents, or various other methods well known in the art, may be employed for the purposes of this invention. More particularly, as taught in the Ohl and Shockley patents, ionic bombardment may be carried out in a vacuum chamber.

Applicants have further discovered that the depth of the layer, which is rendered solvent by bombardment and may be removed by a solvent which will not sensibly affect the remainder of the material, can be accurately controlled by controlling the bombarding energy per unit area to which the crystalline element is subjected. Furthermore, the new surface exposed by the process of bombarding the crystal and dissolving the bombarded surface layer has been found to be markedly smoother. The new surface is free from roughness, scratches, and particles of abrasive material such as are likely to be present following even the most meticulously conducted and highly refined polishing operations known to the art. It is further free from pitting and related irregularities usually resulting from etching by a solvent in which the main body of the crystal is appreciably soluble.

By way of specific example, the crystalline materials silicon and germanium, very widely used in the fabrication of semiconductive elements such as rectifiers and transistors, are substantially insoluble in an aqueous solution of hydrofluoric acid.

However after bombardment by ions, a very thin layer on the surface of elements of silicon and germanium will readily be dissolved by a hydrofluoric acid solution. The depth of the layer is determined by the "dosage" for a given ion energy of the bombardment to which the surface is subjected. The new surface exposed by dissolving the bombarded surface is of greatly increased smoothness.

As is well known to those skilled in the art, a fresh solution comprising twenty parts of concentrated nitric acid, twelve parts of glacial acetic acid, twelve parts of hydrofluoric acid solution (substantially a fifty percent solution of the acid), and one-half part of bromine will etch silicon and germanium crystals. The solution is known in the art by the designation CP4. The depth to which it will etch can be controlled only by "cut and try" methods which leave much to be desired when high accuracy is important and the etched surface will include numerous pits and rough spots.

In view of current progress in the treatment of semiconductive elements to produce very thin wafers having accurately predetermined p and n type regions and extremely small overall physical sizes, suitable for operation at ever higher microwave frequencies, the value of an accurately controllable process for the final shaping of the elements, which also leaves a smooth unpitted surface, is immediately apparent.

A further specific example is diamond, the bombarded surface layer of which can be dissolved in nitric acid leaving an exceptionally smooth surface.

As a concomitant of the process of the invention, applicants have found that silicon rectifying elements bombarded as taught in the above-mentioned patent to R. S. Ohl, after etching and annealing in accordance with the present invention, retain to an appreciable degree the benefits taught by Ohl and are somewhat more stable, as will be discussed in further detail hereinunder.

As is well known to those skilled in the art, the effects of bombardment can be removed, to a great extent, by suitable annealing so that semiconductive elements treated by bombardment and subsequent etching with hydrofluoric acid solution can be annealed thereafter, if desired, to restore the semiconductive element to substantially its initial unbombarded state. In the specific case of silicon, bombardment and washing with hydrofluoric acid solution will, surprisingly, return the material to a state in which the improved "backward rectifying" characteristics resulting from the treatment are largely retained while the less desirable "forward rectifying" characteristics are caused to approach the more nearly ideal "forward rectifying" characteristics of untreated silicon.

Principal objects of the invention are, accordingly, to facilitate the shaping of crystalline elements, particularly semiconductive elements, leaving smooth unpitted surfaces and to increase the stability of particular electrical characteristics of semiconductive material.

Other and further objects, features and advantages of the invention will become apparent during the course of the detailed description given hereinunder, and from the appended claim.

Figure 2:
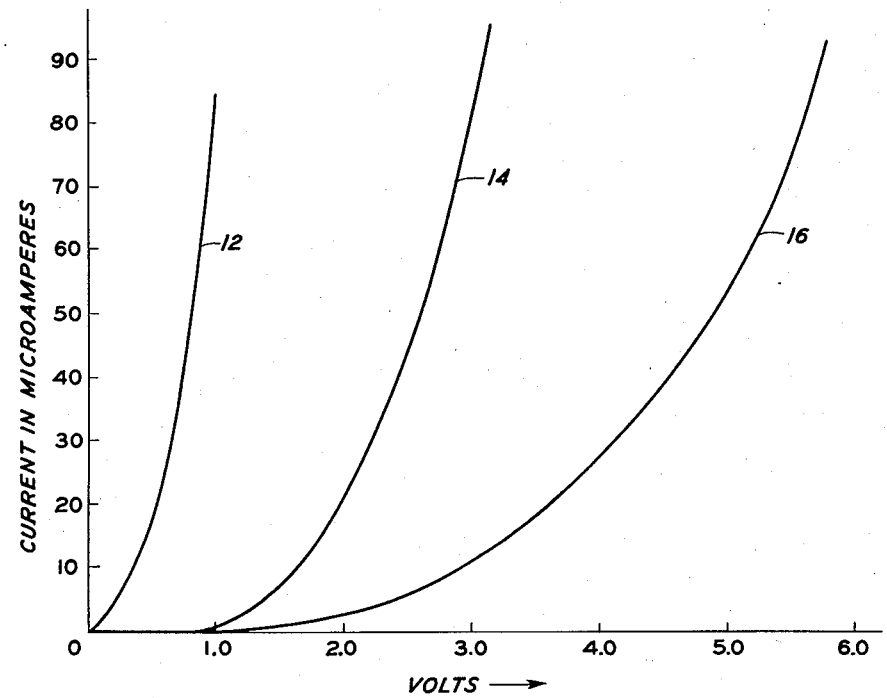
Figure 3:
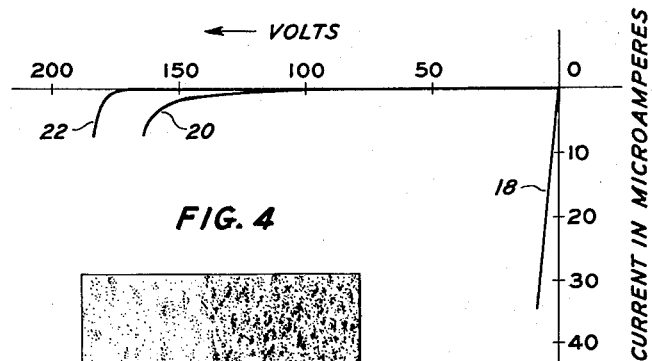
Figure 4:
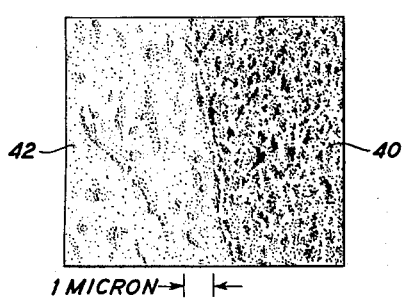

In the accompanying drawings:
FIG. 1 is a curve illustrating the relation between "dosage" of bombardment and depth "d" to which the surface of a semiconductive element can readily be etched with hydrofluoric acid solution following the bombardment;

FIGS. 2 and 3 are sets of curves illustrating the forward and backward rectifying characteristics, respectively, of an element of silicon for the three conditions, (1) untreated, (2) bombarded only, and (3) bombarded and etched in a hydrofluoric acid solution; and FIG. 4 illustrates the contrast with respect to smoothness of a surface processed in accordance with the invention and a highly polished surface of the prior art.

In more detail, in FIG. 1, curve 10 illustrates the variation of the depth of the layer of a crystalline semiconductive element, for example, an element of silicon, which can be etched from the surface in a hydrofluoric acid solution of substantially forty-eight percent of the acid following bombardment, with increasing "dosage" of bombardment. In general, the bombarding techniques can be substantially those disclosed and described in the above-mentioned patents of Ohl and Shockley.

As shown in FIG. 1, from two up to ten microcentimeters can be removed following bombardment by "dosages" varying between 200 and 50,000 microcoulombs per square inch, respectively.

It is estimated that layers of at least 100 microcentimeters can be removed with bombardment energies and dosages which will still not cause disintegration of the element.

The period of etching usually should be continued for thirty minutes. The etching solution for semiconductive elements is preferably a forty-eight percent aqueous solution of hydrofluoric acid.

FIGS. 2 and 3 illustrate the effects of the process of the invention upon the forward and backward rectifying properties, respectively, of an element of silicon.

In FIG. 2, curve 12 is representative of the forward rectifying properties of an unprocessed element of silicon. Curve 16 illustrates the change in the forward rectifying properties of the element after bombardment as taught in the above-mentioned patent to Ohl. Curve 14 illustrates the forward rectifying properties of the bombarded element after etching in a forty-eight percent hydrofluoric acid solution for thirty minutes.

As is apparent from the curves, the characteristic illustrated by curve 14 of FIG. 2 is intermediate those of the untreated and the bombarded element.

Similarly, in FIG. 3 the backward rectifying characteristics of the silicon elements are illustrated, curve 18 being for the untreated element, curve 22 being for the bombarded-only condition of the element, and curve 20 corresponding to bombardment and etching by forty-eight percent hydrofluoric acid solution for substantially thirty minutes.

As will be apparent to those skilled in the art, for particular specific purposes such, for example, as harmonic generation, the characteristics resulting from the combined steps of bombarding and thereafter etching in hydrofluoric acid solution as taught in the present application are of appreciable value especially since they are somewhat more stable than the characteristics obtained by bombardment only.

FIG. 4 illustrates graphically, in greatly magnified form, the degree of smoothness of a surface of a crystalline material treated by the process of the invention as contrasted with a conventional highly polished surface. In FIG. 4, a micron (or one millionth of a meter) has been expanded to substantially a quarter of an inch as indicated. The right hand portion 40 is a highly polished surface prepared with meticulous care in accordance with the most refined polishing methods known in the art. The left hand portion 42 is a surface prepared by the process of the invention, namely, by ion bombardment followed by etching with a selective solvent which dissolves the bombarded surface but in which the unbombarded crystalline material is substantially insoluble. As illustrated in portion 40, the polished surface is substantially covered with relatively rough irregularities while the portion 42 has many fewer and much smaller irregularities, i.e. it is much smoother.

Incidentally, FIG. 4 also illustrates that a predetermined portion only of a selected surface can be treated in accordance with the invention. This can be readily accomplished by masking the portions which are not to be treated during the bombarding step. Wax or metal masks may be used in accordance with conventional practices in the art. Alternatively, selective bombardment can be accomplished by focusing the beam of ions and controlling its position and movement with respect to the surface. For example, diffraction gratings comprising very fine lines very closely spaced, "engraved" into the crystal surface by the process of the invention, are much to be preferred to gratings formed by mechanically scratching lines on the surface.

Numerous and varied other applications and modifications of the principles of the invention clearly within the spirit and scope thereof will readily occur to those skilled in the art.

What is claimed is:

The method of processing a surface of an element of a material selected from the group consisting of silicon and germanium which comprises bombarding the surface of the element with ions at a concentration of between 200 and 50,000 microcoulombs per square inch to form a quasi-amorphous layer soluble in hydrofluoric acid and immersing the element in an aqueous solution of hydrofluoric acid to completely dissolve said layer.

References Cited in the file of this patent

UNITED STATES PATENTS

| | | |
|---|---|---|
| 2,462,218 | Olsen | Feb. 22, 1949 |
| 2,563,503 | Wallace | Aug. 7, 1951 |
| 2,583,681 | Brittain et al. | Jan. 29, 1952 |
| 2,597,028 | Pfann | May 20, 1952 |
| 2,602,211 | Scaff et al. | July 8, 1952 |
| 2,656,496 | Sparks | Oct. 20, 1953 |
| 2,787,564 | Shockley | Apr. 2, 1957 |

FOREIGN PATENTS

| | | |
|---|---|---|
| 695,178 | Great Britain | Aug. 5, 1953 |